(12) United States Patent
Yamaguchi

(10) Patent No.: US 6,960,752 B1
(45) Date of Patent: Nov. 1, 2005

(54) CALIBRATION CAMERA DEVICE

(75) Inventor: Kazuo Yamaguchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/101,126

(22) Filed: Apr. 7, 2005

(30) Foreign Application Priority Data

Apr. 8, 2004 (JP) .............................. 2004-114347

(51) Int. Cl.[7] .......................................... H01J 40/14
(52) U.S. Cl. .................. 250/208.1; 250/216; 250/226; 348/229.1
(58) Field of Search ........................ 250/208.1, 216, 250/226, 214 R, 214 AG, 214 P, 214 C; 348/218.1, 229.1, 270, 274, 276; 353/30, 353/31

(56) References Cited

U.S. PATENT DOCUMENTS 5,581,301 A * 12/1996 Ninomiya .................. 348/342

FOREIGN PATENT DOCUMENTS

| JP | 06201472 A |   | 7/1994 |          |
|----|------------|---|--------|----------|
| JP | 9-326981 A |   | 12/1997 |         |
| JP | 2005020314 A | * | 1/2005 | .......... H04N 17/00 |

* cited by examiner

*Primary Examiner*—Kevin Pyo
(74) *Attorney, Agent, or Firm*—Volpe and Koenig, P.C.

(57) ABSTRACT

A calibration camera device for geometrical correction or color correction, including an optical lens part, an optical filter part which is provided in front of the optical lens part and to which at least three optical filters are attached, a filter switching part to select any one from among the optical filters and dispose the selected one optical filter at a photometric point, a near-infrared light cutting part which is provided in the rear of the optical lens part and to which a near-infrared light cutting filter is attached, a monochrome capturing part which is provided in the rear of the near-infrared light cutting part and includes a monochrome imaging element, an image storing part for storing a monochrome image which is captured by the monochrome capturing part, and a gain correction part for conducting sensitivity correction on the monochrome image.

7 Claims, 8 Drawing Sheets

(a)

(b)

(a)

(b)

CALIBRATION CAMERA DEVICE

BACKGROUND OF THE INVENTION

1. Field of the Invention

The present invention relates to a calibration camera device which can be used in geometrical correction in combination with color correction by itself and particularly to a calibration camera device which is preferably used in image quality control of an image displaying device.

2. Description of the Related Art

Conventionally, an image displaying device has been proposed wherein a plurality of images are projected from the corresponding projectors and synthesized as one large image on one screen. At each projector, however, may occur geometrical distortion, color shading, luminance shading, difference in gamma characteristic, difference in white balance and the like. In this case, the differences in image quality between the projectors become conspicuous, thereby deteriorating the displaying quality of the image displaying device. In this point of view, an image displaying device is proposed wherein a camera is provided in front of the screen, and a test pattern displayed on the screen is captured, and correction data is calculated on the captured image, and the input image is corrected on the correction data and output, thereby conducting geometrical correction, color correction and luminance correction (see, Patent publication No. 1).

Among the above-mentioned corrections, the color correction is often conducted by means of a color measuring device or the like. Since the color measuring device is expensive and is required to be set at every point if in the color correction, there are a plurality of photometric points, however, the cost in the color correction may be increased and the operationality in the color correction may be complicated. In order to iron out this problem, a two-dimensional color measuring device is proposed wherein the color correction can be conducted simultaneously for the plurality of photometric points (see, Patent publication No. 2). In the use of the two-dimensional color measuring device, the operation to set the measuring device to the plurality of photometric points can be mitigated.

[Patent publication No. 1] Japanese Patent Application Laid-open No. 9-326981

[Patent publication No. 2] Japanese Patent Publication No. 3246021

The two dimensional color measuring device disclosed in Patent Publication No. 2 is so configured as to install, in an capturing device (camera), an optical filter made of a relatively expensive interference filter (e.g., made of glass) close to the color matching functions of a given three-dimensional displaying color system. Therefore, the total cost of the two dimensional color measuring device is increased because the parts cost is increased due to the use of the interference filter and the operationality becomes complicated due to the precise attachment of the optical filter in the capturing device. Then, if the geometrical correction and the color correction are conducted simultaneously, another capturing device (camera) for the geometrical correction must be provided in addition to the capturing device for the color correction, so that the setting cost and the setting space of the capturing devices may be increased and the setting period of time of the capturing devices may be elongated.

SUMMARY OF THE INVENTION

It is an object of the present invention to provide a not expensive calibration camera device with good operationality which is configured so that at least three optical filters are selectively used, thereby conducting the geometrical correction and color correction simultaneously by itself.

In order to achieve the first object, the invention of claim 1 relates to a calibration camera device for geometrical correction or color correction, comprising:

an optical lens part to which a lens is attached, an optical filter part which is provided in front of the optical lens part on an optical path and to which at least three optical filters are attached, a filter switching part to select any one from among the optical filters and dispose the selected one optical filter at a photometric point on the optical path, a near-infrared light cutting part which is provided in the rear of the optical lens part and to which a near-infrared light cutting filter is attached, a monochrome capturing part which is provided in the rear of the near-infrared light cutting part on the optical path and includes a monochrome imaging element, an image storing part for storing a monochrome image which is captured by the monochrome capturing part, and a gain correction part for conducting sensitivity correction on the monochrome image which is captured by the monochrome capturing part through the selected one optical filter which is selected by the filter switching part.

The invention of claim 2 relates to a calibration camera device as defined in claim 1, wherein each optical filter includes soft filmy optical filters, and in the color correction, each optical filter is configured so that a designed spectral transmittance characteristic of each optical filter can be realized by selecting and overlapping one or more of the soft filmy optical filters.

The invention of claim 3 relates to a calibration camera device as defined in claim 2, wherein a spectral transmittance characteristic of said optical filters, a spectral transmittance characteristic of the near-infrared light cutting filter and a spectral transmittance characteristic of the imaging element are superimposed to obtain a sensitivity characteristic of the monochrome image at capturing, and the sensitivity characteristic is approached to color matching functions of a three stimulus color displaying system.

The invention of claim 4 relates to a calibration camera device as defined in claim 1, wherein in the geometrical correction, the optical filter part is set transparent over a visible light range by the filter switching part.

The invention of claim 5 relates to a calibration camera device as defined in claim 2, wherein the soft filmy optical filter is a gelatine optical filter.

The invention of claim 6 relates to a calibration camera device as defined in claim 1, wherein the filter switching part includes a pair of rolling mechanisms and a belt-shaped member which is to be rolled by the rolling mechanisms and on which the optical filters are arranged.

The invention of claim 7 relates to a calibration camera device as defined in claim 1, wherein the filter switching part includes a slide photograph equipment with openings and the optical filters are attached to the openings.

According to the invention of claim 1, since at least three optical filters are attached to the optical filter part which is provided in front of the optical lens part to which the lens is attached on the optical path and one appropriate optical filter is disposed at the photometric point on the optical path through the selection of the filter switching part, the monochrome image which is captured through the selected optical filter depends on the characteristics of the selected optical filter, the lens and the near-infrared light cutting filter which constitute an optical system. Therefore, the sensitivity correction is conducted on the monochrome image by the gain correction part. In the color correction, therefore, the correction data from the sensitivity correction on the monochrome image by the gain correction part is utilized as it is. In the geometrical correction, the correction data from the sensitivity correction on the monochrome image which is captured substantially without filters (e.g., correction data from the sensitivity correction on the monochrome image which is captured through a filter which is transparent over a visible light range or correction data from the sensitivity correction on the monochrome data which is captured without filters). As a result, both of the geometrical correction and the color correction can be conducted on only the calibration camera device of the present invention. In this point of view, the total cost and the operationality of the calibration camera device can be enhanced.

According to the invention of claim 2, each optical filter includes soft filmy optical filters, and in the color correction, each optical filter is configured so that a designed spectral transmittance characteristic of each optical filter can be realized by selecting and overlapping one or more of the soft filmy optical filters. Therefore, since the optical filters can be attached on a belt-shaped member which is to be rolled by rolling mechanisms constituting the filter switching part, the filter switching part can be downsized.

According to the invention of claim 3, since a spectral transmittance characteristic of the optical filters, a spectral transmittance characteristic of the near-infrared light cutting filter and a spectral transmittance characteristic of the imaging element are superimposed to obtain a sensitivity characteristic at capturing, and the sensitivity characteristic is approached to color matching functions of a three stimulus color displaying system, the calibration camera device can be configured so that the characteristic of the captured monochrome image device can be matched to the color matching functions.

According to the invention of claim 4, since in the geometrical correction, the optical filter part is set transparent over a visible light range by the filter switching part (e.g., a transparent filter over the visible light range or a plate with an opening through which a light within the visible light range is passed may be used.), the calibration can be conducted by utilizing the correction result at the time when the monochrome image data which is obtained without filters is corrected in sensitivity by the gain correction part. As a result, both of the geometrical correction and the color correction can be conducted on only the calibration camera device of the present invention. In this point of view, the total cost and the operationality of the calibration camera device can be enhanced.

According to the invention of claim 5, since the soft filmy optical filter made of a gelatine optical filter which is not expensive, the cost of the optical filters can be reduced, and thus, the total cost of the calibration camera device of the present invention can be reduced.

According to the invention of claim 6, since the filter switching part includes a pair of rolling mechanisms and a belt-shaped member which is to be rolled by the rolling mechanisms and on which the optical filters are arranged, the filter switching part can be downsized as mentioned above.

According to the invention of claim 7, since the filter switch-ing part includes a slide photograph equipment with openings and the optical filters are attached to the openings, the number of the optical filters can be easily varied by varying the number of the openings.

BRIEF DESCRIPTION OF THE DRAWINGS

In order to bring about a greater understanding of the present invention, a description will be given on the accompanying drawings.

DETAILED DESCRIPTION OF THE PREFERRED EMBODIMENTS

The present invention will now be described hereinafter with reference to the accompanying drawings.

First Embodiment

Figure 1:
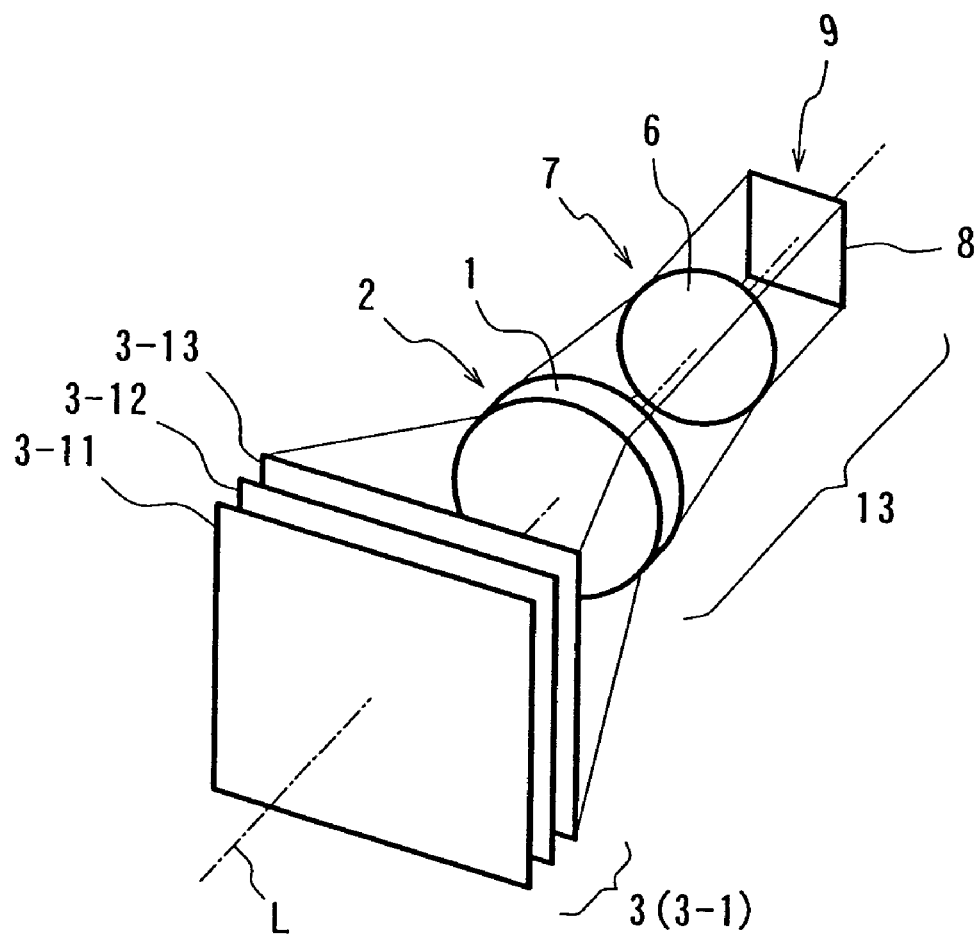
FIG. 1 is a perspective view showing the principal structure of a calibration camera device according to a first embodiment of the present invention.
Figure 2:
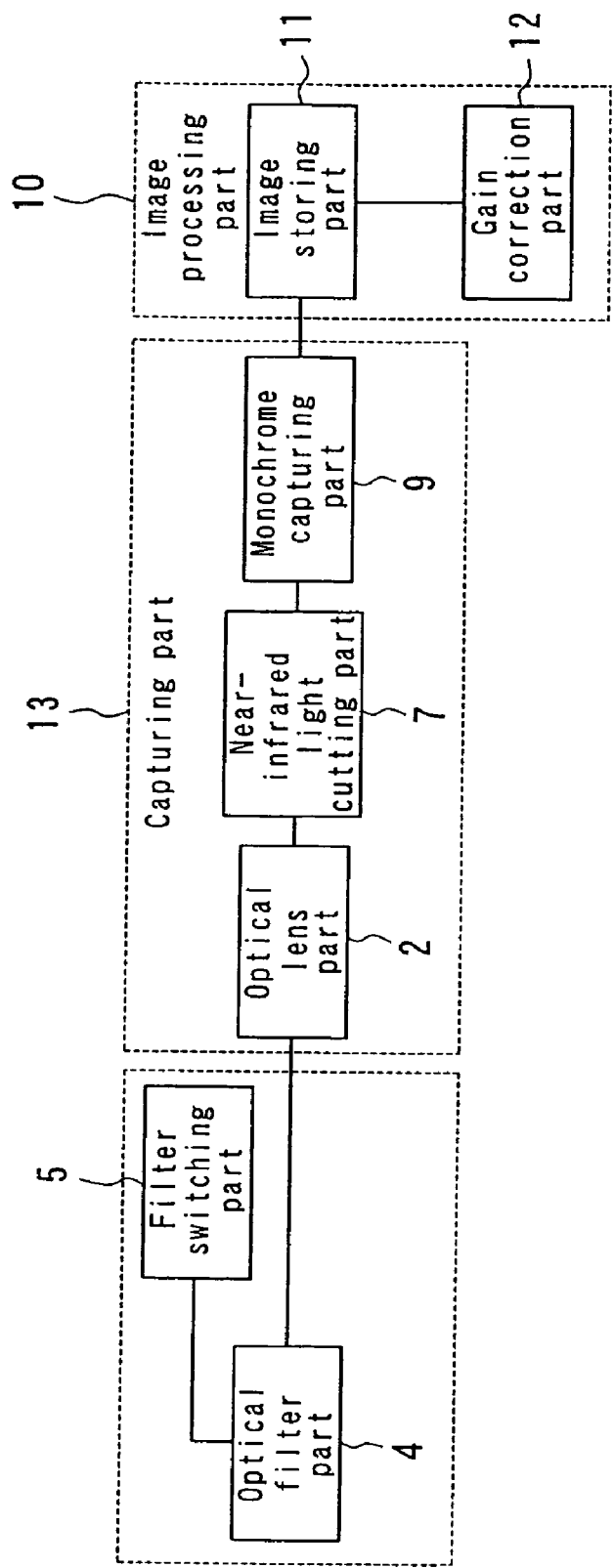
FIG. 2 is a functional block diagram of the calibration camera of the first embodiment.
Figure 3:
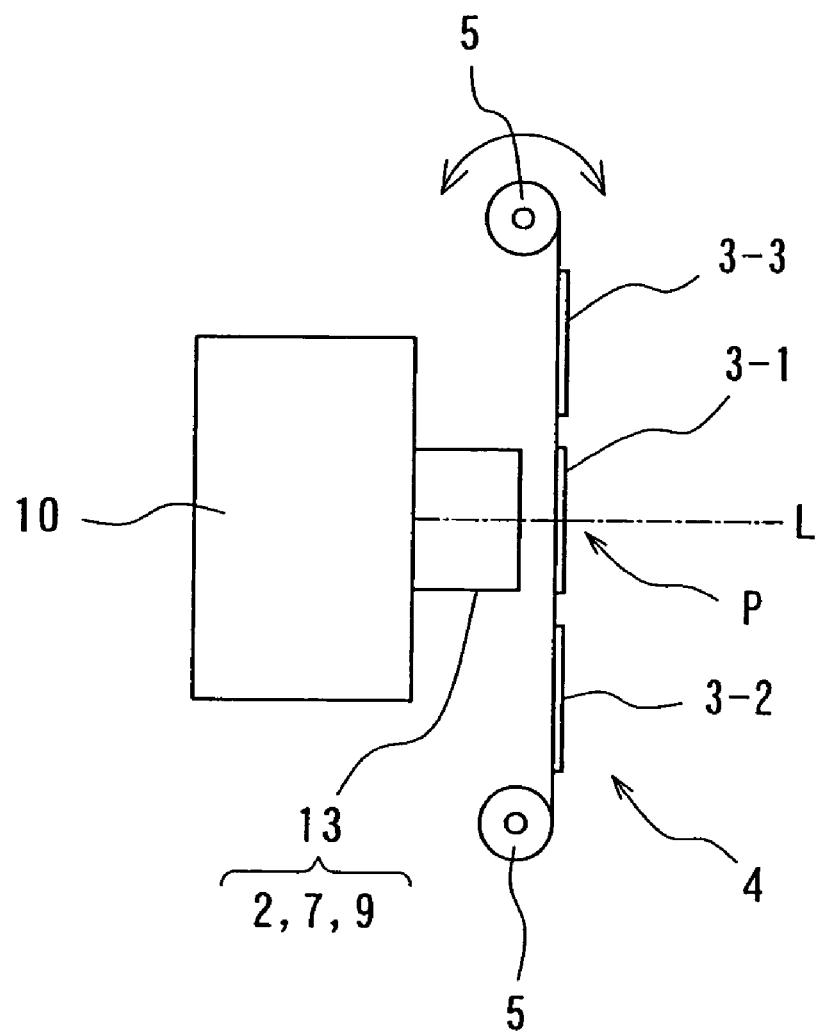
FIG. 3 is a top plan view of the calibration camera device of the first embodiment, as viewed from the top of the calibration camera device.

FIG. 1 is a perspective view showing the principal structure of a calibration camera device according to a first embodiment of the present invention. FIG. 2 is a functional block diagram of the calibration camera of the first embodiment. FIG. 3 is a top plan view of the calibration camera device of the first embodiment, as viewed from the top of the calibration camera device.

In this embodiment, the calibration camera is configured so that geometrical correction and color correction can be conducted simultaneously, and as shown in FIG. 1, includes an optical lens part 2 to which a lens 1 is attached, an optical filter part 4 which is located in front of the optical lens part 2 on the optical path L and to which at least three optical filters 3 are attached (in the embodiment shown in FIG. 3, three optical filters 3-1, 3-2, 3-3 are provided), a filter switching part 5 which selects one among the optical filters 3 which are attached to the optical filter part 4 and disposes the selected one at the photometric point P on the optical path L (refer to FIG. 3), a near-infrared light cutting part 7 which is located in the rear of the optical filter part 4 on the optical path L and to which a near-infrared light cutting filter 6 is attached, a monochrome imaging part 9 which is located in the rear of the near-infrared cutting part 7 on the optical path L and contains a monochrome imaging element 8, an image storing part 11 which is located in an image processing part 10 shown in FIGS. 2, 3 and stores an monochrome image captured by the monochrome imaging part 9, and a gain correction part 12 which is located in the image processing part 10 and corrects sensitivity change at capturing on the monochrome image captured through the selected optical filters 3 which is selected by the filter switching part 5 located in the image processing part 10. Hereinafter, the total part containing the optical lens part 2, the near-infrared light cutting part 7 and the monochrome capturing part 9 is called as a "capturing part 13".

As the lens 1 may be exemplified a lens commercially available which can be attached to the optical lens part 2 of the capturing part 13 and a lens integrated with the imaging part 13. In this embodiment (present invention), therefore, it is not required that a specially processed lens is applied to the imaging lens 1, so that the features of the lens 1 can not be treated as important.

As the optical filters 3 (optical filters 3-1, 3-2, 3-3) may be exemplified soft filmy optical filers, respectively. In this embodiment, the optical filters 3 are made of gelatine optical filters as not expensive soft filmy optical filters, respectively. In this case, since each optical filter can not almost exhibit the desired spectral transmittance characteristic when each optical filter is made of one gelatine optical film, for example, each optical filter (optical filter 3-1, 3-2, 3-3) is made of a plurality of soft filmy optical filters. In use, the plurality of soft filmy optical filters are overlapped with one another so that the desired spectral transmittance characteristic of the corresponding optical filter can be realized. For example, with the optical filter 3-1 shown in Figures, three gelatine filters 3-11, 3-12, 3-13 are overlapped with one another.

The filter switching part 5, as shown in FIG. 3, is composed of a pair of rolling mechanism and a belt-shaped member which is to be rolled by the rolling mechanism. The rolling mechanism is configured so that the belt-shaped member is moved clockwise or counterclockwise on the indication from the controlling section (not shown) of the image processing part 10, and a desired optical filter (in the embodiment shown in FIGS. 1 and 3, the optical filter 3-1 is selected) is selected from the optical filters attached on the belt-shaped member and disposed at the photometric point P on the optical path L. In this embodiment, since such gelatine optical filters are employed, the gelatine optical filters can not be broken when the gelatine optical filters are rolled by the rolling mechanism, which is different from the case in that glassy optical filters are employed. In this point of view, the filter switching part shown in FIG. 3 can be realized. The use of the filter switching part 5 enables the space to dispose the part 5 to be narrowed and the optical filters to be protected against atmosphere and dust.

As the imaging element 8 of the monochrome imaging part 9 may be exemplified a CCD camera and a CMOS sensor. In this embodiment, although the monochrome imaging element 8 is employed, a color imaging element may be employed instead of the monochrome imaging element 8. In this embodiment, although the image storing part 11 and the gain correction part 12 of the image processing part 10 are installed in the PC, they may be constituted from the corresponding image processing devices, respectively. As the capturing part 13 may be exemplified a monochrome camera mechanism commercially available to which a near-infrared light cutting filter can be attached.

In the calibration camera device of this embodiment, the constitutions of "the optical filters 3 being composed of a plurality of (e.g., three) gelatine filters which are overlapped", "the lens 1", and "the near-infrared light cutting filter 6" are combined, thereby realizing a two-dimensional color measuring device which can convert capturing characteristics into color matching function characteristics of a three-dimensional (XYZ) displaying color system only by selecting an appropriate combination from among gelatine filters. In the realization of a desired characteristic of the two-dimensional color measuring device similar to the characteristics of color matching functions of a normal three-dimensional displaying color system, since the band characteristic within a near-infrared light range can be varied by the near-infrared light cutting filter of the combined constitution, the desired characteristic of the two-dimensional color measuring device can be realized by varying the characteristics of the optical filters through the selective combination of the gelatine filters which are not expensive.

In this embodiment, since the photometric (color measuring) object is the screen of the image displaying device and the character-istic distribution of the screen can be known to some degree in advance, it is not required that the color matching function characteristics of the three-dimensional (XYZ) displaying color system are matched over the screen. Therefore, an appropriate combination from among the gelatine filters can be conducted easily on the selecting method which will be described in detail, thereby simplifying the manufacture of the calibration camera device and thus, reducing the manufacturing cost of the calibration camera device.

Also, in this embodiment, since each optical filter is made of the selective combination of the gelatine filters which are overlapped with one another in use, the optical directivity of the each optical filter can be reduced in comparison with an optical filter made of a glassy interference filter or the like. Therefore, precise attachment is not required, thereby reducing the manufacturing cost of the calibration camera device. Moreover, if a monochrome camera mechanism installing a near-infrared light cutting filter is employed as the capturing part 13 or if a monochrome camera mechanism which can be provided later is employed as the near-infrared light cutting filter, the manufacturing cost of the calibration camera device can be also reduced.

Figure 4:
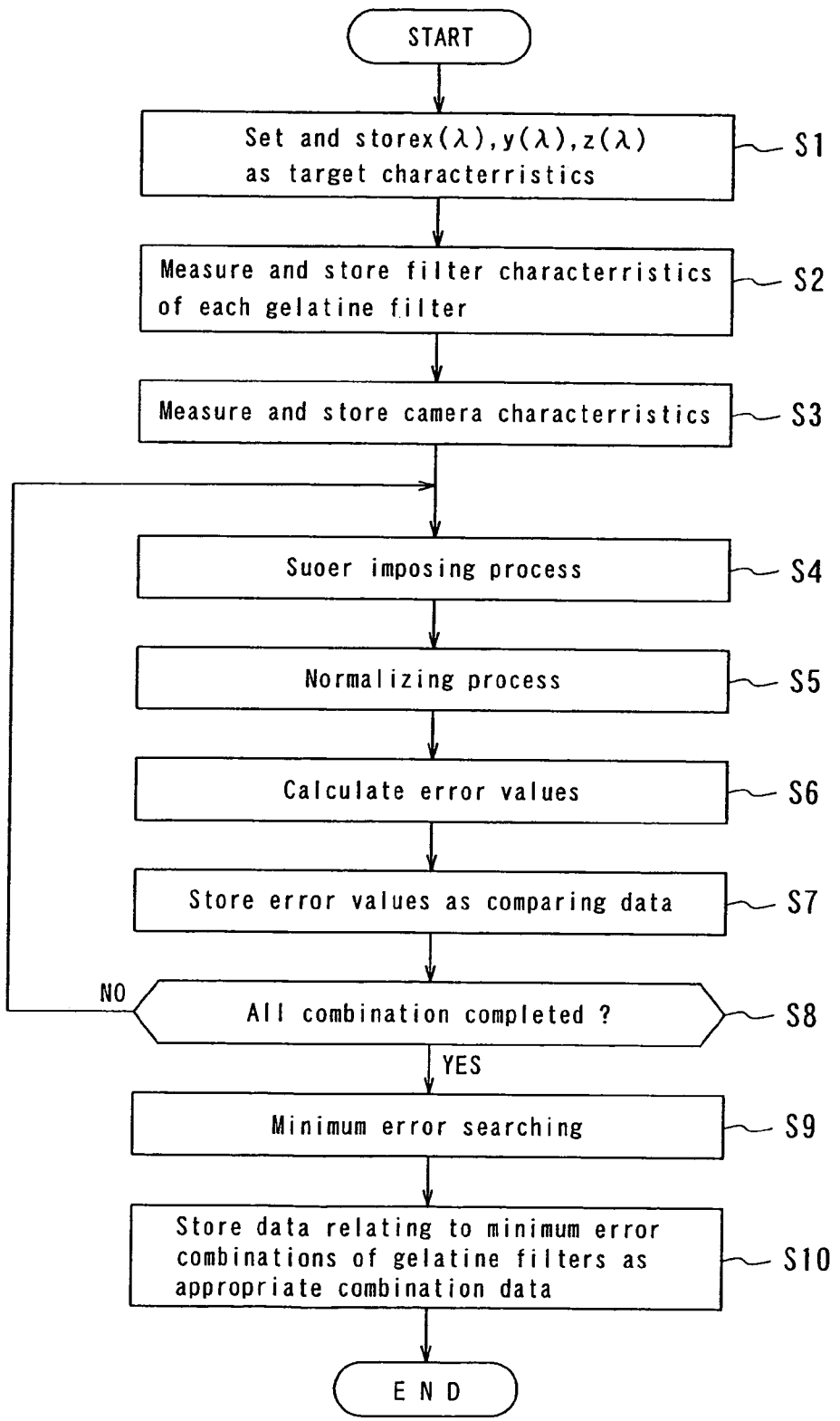
FIG. 4 is a flow chart for explaining the selecting method from a plurality of gelatine filters in the calibration camera device of the first embodiment.

Then, the selecting method of the gelatine filters which are overlapped with one another in use will be described with reference to FIG. 4, wherein the gelatine filters are selected so as to realize the optical filters with a spectral transmittance characteristic close to the desired color matching functions of a three-dimensional displaying color system. In FIG. 4, at Step S1, the desired color matching functions $x(\lambda), y(\lambda), z(\lambda)$ of a three-dimensional displaying color system are defined and then, stored as target characteristics in a storing device (not shown). At Step S2, the spectral transmittance characteristics of the gelatine filters which are prepared in advance are measured and then, stored in a storing device (not shown). At Step S2, as many as possible data are measured and stored so as to realize the optical filter on the ensuing steps. At Step S3, the camera characteristic of the optical system composed of the lens 1, the near-infrared light cutting filter 6 and the imaging element 8 at the capturing part 13 are measured and stored in a storing device (not shown).

Then, at Step S4, a selecting process is conducted. In the selecting process, the spectral transmittance characteristics of the combination appropriately selected from among the filter characteristic data of the corresponding gelatine filters which are stored at Step S2 and the camera characteristic data which is stored at Step S3 are superimposed. At Step S5, a normalizing process is conducted. In the normalizing process, the attenuation in transmittance at the time when the gelatine filters are overlapped with one another is compensated by comparing the thus obtained superimposed characteristic with the target characteristics.

At Step S6, the error values between the target characteristics of the optical filters and the characteristic data obtained at Step S4 are calculated. In the calculation, for example, the least squares method is employed to digitalize the error values. At Step S7, the digitalized error values are stored in a storing device (not shown) with associated with the combination data of the gelatine filters, respectively.

At Step S8, whether all of the combinations of the gelatine filters are completed or not is checked, and if not, Steps S4–S7 are repeated. If done, at step S9, a minimum error searching is conducted. At Step S10, "the data relating to minimum error combinations of the gelatine filters" which are obtained in the minimum error searching are stored as appropriate combination data" in a storing device (not shown). The above-mentioned steps are conducted for the optical filters corresponding to the desired color matching functions $x(\lambda),y(\lambda),z(\lambda)$.

Then, the effect/function in calibrating operation of the calibration camera device of this embodiment will be described. In order to download, into the image storing part 11 of the image processing part 10, the image data of a photometric object which are obtained by capturing the object by the monochrome imaging part 9, when the sensitivity ratio of the desired color matching functions $x(\lambda),y(\lambda),z(\lambda)$ of a three stimulus color displaying system is [1.06291]: [1]: [1.782968], for example, the sensitivity ratio of the calibration camera device must be matched to the above-exemplified sensitivity ratio at capturing. In the matching, since the normalization has been already conducted at Step S5, the desired calibration can be conducted only by comparing the characteristic shapes of the desired color matching functions $x(\lambda),y(\lambda),z(\lambda)$ with the characteristic shape of the image data captured by the calibration camera device.

Figure 5:
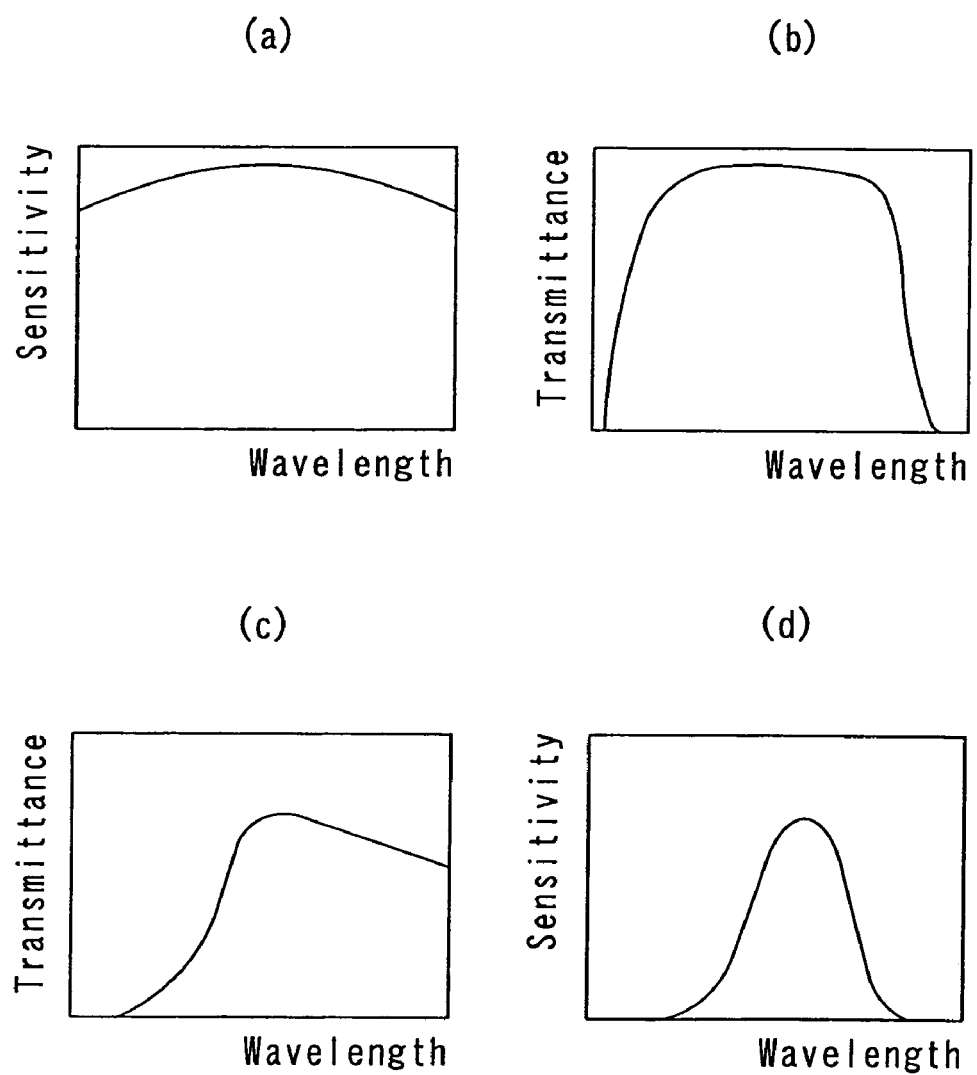
FIG. 5(a) is a graph showing the spectral sensitivity characteristic of the imaging device of the first embodiment.
FIG. 5(b) is a graph showing the spectral transmittance characteristic of the near-infrared light-cutting filter of the first embodiment.
FIG. 5(c) is a graph showing the spectral transmittance characteristic of the optical filters of the first embodiment.
FIG. 5(d) is a graph showing the spectral sensitivity characteristic obtained by superimposing the spectral sensitivity characteristics relating to FIGS. 5a–5c.

For example, the characteristic of monochrome image data obtained through capturing using the imaging element 8 can be obtained by superimposing the spectral sensitivity characteristic of the imaging element 8 shown in FIG. 5(a), the spectral transmittance characteristic of the near-infrared light cutting filter 6 shown in FIG. 5(b), the spectral transmittance characteristic of the optical filters 3 shown in FIG. 5(c) and the spectral transmittance characteristic of the lens 1, which is shown in FIG. 5(d). In the matching, therefore, the characteristic of the monochrome image data shown in FIG. 5(d) is approached to the characteristics of the color matching functions $x(\lambda),y(\lambda),z(\lambda)$. Herein, in FIG. 5, the abscissa axis designates a wavelength within a visible light range. In FIGS. 5(a) and (d), the ordinate axis designates a sensitivity, and in FIGS. 5(b) and (c), the ordinate axis designates a transmittance.

Therefore, since the correction information at the time when the monochrome image data storing in the image storing part 11 is corrected in sensitivity by the gain correction part 12 at image processing in the image processing part 10 can be utilized as a color measuring information at color correction, the characteristic of the monochrome image data captured by the calibration camera device can be matched to the characteristics of the color matching functions $x(\lambda),y(\lambda),z(\lambda)$. In the gain correction part 12, only one gain value may be held at the corresponding filter or a plurality of gain value (pixel number of image at the maximum) may be held at the corresponding filter.

In the geometrical correction using the calibration camera device of this embodiment, the optical filters 3 are appropriately selected by the filter switching part 5 so that the optical filter part 4 can be transparent over a visible light range. For example, a transparent filter over the visible light range or a plate with an opening through which a light within the visible light range is passed may be used. In this case, the calibration can be conducted by utilizing the correction result at the time when the monochrome image data which is obtained substantially without filters is corrected in sensitivity by the gain correction part 12. In this case, if the geometrical correction is not required in the calibration using the calibration camera device, it may not done.

According to this embodiment, since the calibration camera device is composed of the gelatine filters which are not expensive and can conduct the geometrical correction and color correction by itself, the cost of the calibration camera device can be reduced remarkably due to the low parts costs and the high operationality. Also, since the monochrome camera mechanism installing the near-infrared light cutting filter is employed as the capturing part 13 and the PC is employed as the image processing part 10, if the filter mechanism composed of the optical filter part 4 and the filter switching part 5 is varied, the characteristic of the calibration camera device can be easily varied.

Second Embodiment

Figure 6:
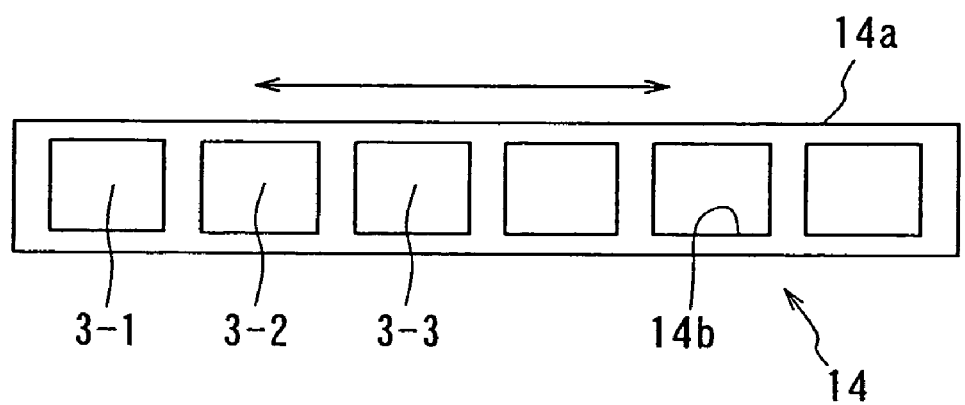
FIG. 6 is a view showing the substantial part of a calibration camera device according to a second embodiment of the present invention, FIGS. 7(a) and (b) are characteristic views showing the spectral transmittance characteristics of a calibration camera device according to a third embodiment of the present invention, and FIGS. 8(a) and (b) are views showing the substantial parts of a calibration camera device according to a fourth embodiment of the present invention.

FIG. 6 is a view showing the substantial part of a calibration camera device according to a second embodiment of the present invention. In this embodiment, the calibration camera device includes a filter switching part 14 as shown in FIG. 6 which is diverted from a normal slide photograph equipment, instead of the rolling filter switching part 5. The filter switching part 14 is constituted from a frame member 14a with three or more openings 14b (in this embodiment, the number of the openings are set to six). Then, gelatine filters are attached to the openings, respectively, e.g., with adhesion as in the first embodiment. Each gelatine filter constitutes an optical filter. The optical filters is designated by reference numeral "3", and each optical filter is numbered as 3-1, 3-2, 3-3 . . . . In the filter switching part 14, a desired filter can be positioned at the photometric point of the optical path by moving the frame member 14a back and forth as shown by the arrow. In the filter switching part 14, since three or more optical filters can be provided, other optical filters can be provided in addition to the optical filters corresponding to three stimulus colors. The number of the optical filters can be easily varied by varying the number of the openings as in the first embodiment.

According to this embodiment, the same effect/function as the first embodiment can be attained, and the slide photograph equipment can be easily available and the gelatine filters can be easily attached.

Third Embodiment

Figure 7:
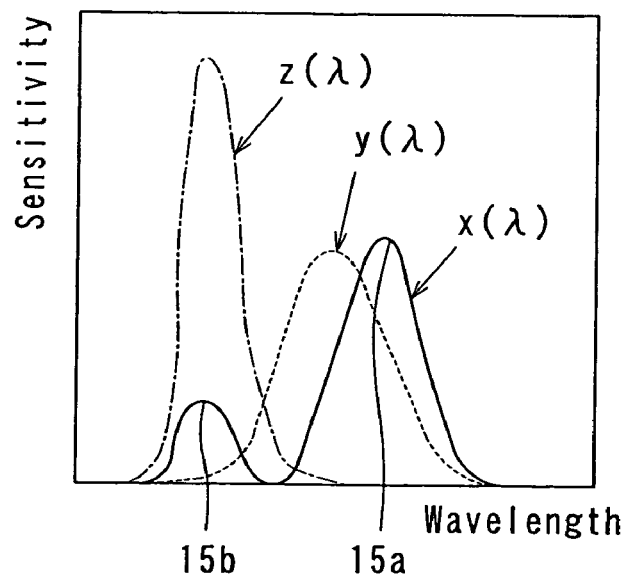
Figure 7:
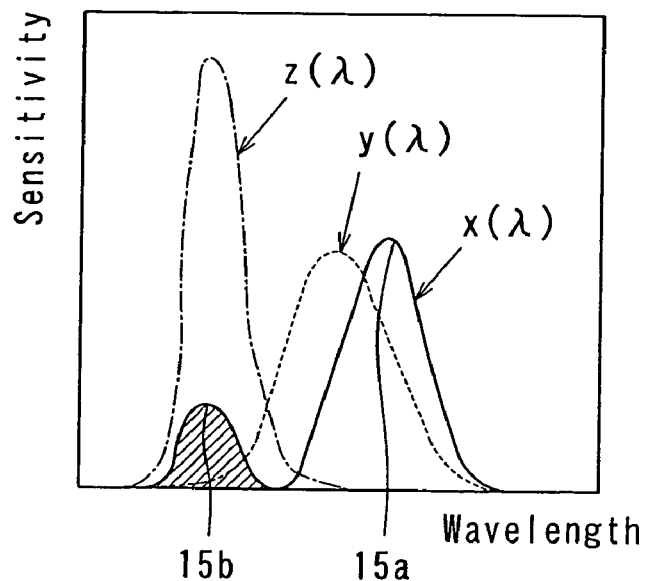

FIGS. 7(a) and (b) are characteristic views showing the spectral transmittance characteristics of a calibration camera device according to a third embodiment of the present invention. In this embodiment, the calibration camera device includes the color matching functions $x(\lambda),y(\lambda),z(\lambda)$ of a three stimulus color XYZ displaying system as shown in FIG. 7(a), wherein the function x(λ) exhibits two peaks 15a and 15b. In this case, the function x(λ) can not be almost realized by selecting appropriate ones from among gelatine filters so as to constitute the optical filter so that the characteristic of the optical filter is similar to the characteristic of the function x(λ). In this point of view, it is preferred that the function x(λ) is realized by selecting appropriate ones from among gelatine filters so that the transmittance within the band range containing the smaller peak 15b is set to zero. In this case, the characteristic of the function x(λ) can be set almost equal to the characteristic of the optical filter composed of the selected gelatine filters almost without error. However, since the removal of the band range containing the peak 15b may affect on the constitution of the optical filter made of the gelatine filters, the band range containing the peak 15b may be substituted with the function z(λ). Also, the gelatine filters may be appropriately selected in view of only the band range containing the peak 15b.

Fourth Embodiment

Figure 8:
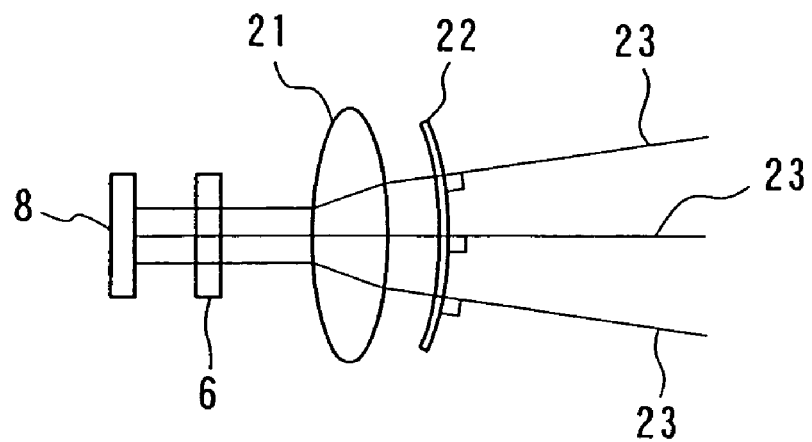
Figure 8:
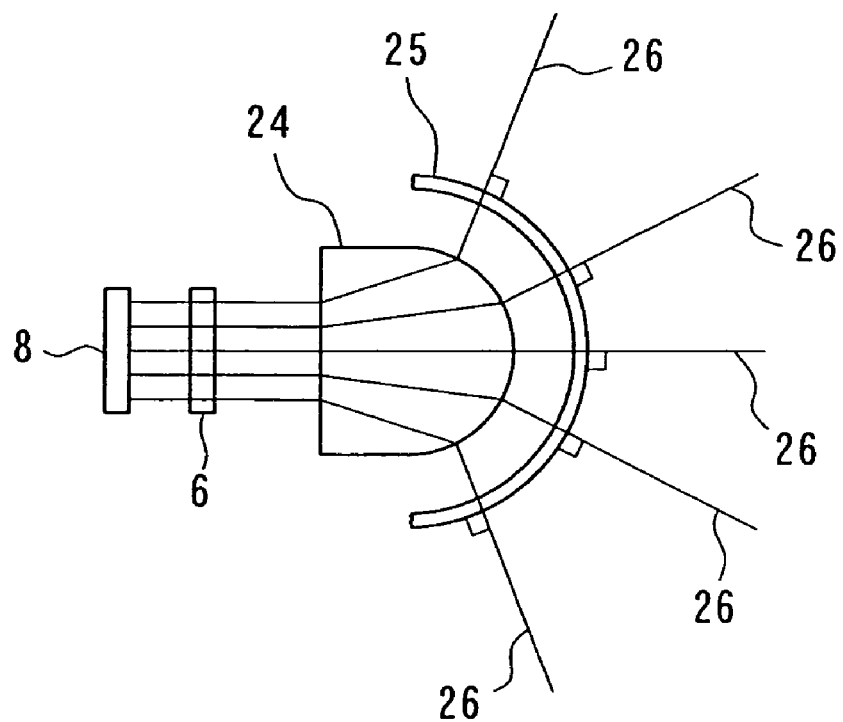

FIGS. 8(a) and (b) are views showing the substantial parts of a calibration camera device according to a fourth embodiment of the present invention. In this embodiment, the feature of "in the nonuse of a filter-installed capturing part (camera), it is not required to modify the structure of the capturing part (camera) except the attachment of the near-infrared light cutting filter", which is characterized in the first embodiment through the third embodiment, is developed.

In the calibration camera device shown in FIG. 8(a), an interference filter 22 (e.g., made of glass) is provided in front of a lens 21, and the shape of the interference filter 22 is configured so that an incident light is perpendicular to the main surface of the interference filter 22 as shown by a normal line 23. In this case, the shape of the interference filter 22 can be determined commensurate with the design of the lens 21 or on the actual image of the interference filter which is captured by a given imaging device such as a CCD or a CMOS. The reason the shape of the interference filter is formed so that the incident light is perpendicular to the main surface of the interference filter is that the performance of the interference filter can be constant irrespective of the incident angle of the incident light because the interference filter has directivity inherently. In the use of an absorption filter such as a gelatine filter or a color glass filter, the above-mentioned shape design of the filter is not required because the absorption filter does not have directivity inherently.

In FIG. 8b, the calibration camera device is modified so as to use a fish-eye lens. In this embodiment, an interference filter 25 (e.g., made of glass) is provided in front of a lens 24, and the shape of the interference filter 25 is configured so that an incident light is perpendicular to the main surface of the interference filter 25 as shown by a normal line 26. The fish-eye lens is designed so that the visibility angle is beyond 180° so as not to interfere with the capturing part (camera) case.

According to this embodiment, since the capturing part (camera) is designed as shown in FIG. 8(a) or FIG. 8(b), the structure of the capturing part is not almost required to be modified. In this point of view, the capturing part may be made of a camera commercially available, and may be selected on use.

Although the present invention was described in detail with reference to the above examples, this invention is not limited to the above disclosure and every kind of variation and modification may be made without departing from the scope of the present invention.

What is claimed is:

1. A calibration camera device for geometrical correction or color correction, comprising:
    an optical lens part to which a lens is attached,
    an optical filter part which is provided in front of said optical lens part on an optical path and to which at least three optical filters are attached,
    a filter switching part to select any one from among said optical filters and dispose said selected one optical filter at a photometric point on said optical path,
    a near-infrared light cutting part which is provided in a rear of said optical lens part and to which a near-infrared light cutting filter is attached,
    a monochrome capturing part which is provided in a rear of said near-infrared light cutting part on said optical path and includes a monochrome imaging element,
    an image storing part for storing a monochrome image which is captured by said monochrome capturing part, and
    a gain correction part for conducting sensitivity correction on said monochrome image which is captured by said monochrome capturing part through said selected one optical filter which is selected by said filter switching part.

2. The calibration camera device as defined in claim 1, wherein each optical filter includes a plurality of soft filmy optical filters, and in said color correction, each optical filter is configured so that a designed spectral transmittance characteristic of each optical filter can be realized by selecting and overlapping one or more of said soft filmy optical filters.

3. The calibration camera device as defined in claim 2, wherein a spectral transmittance characteristic of said optical filters, a spectral transmittance characteristic of said near-infrared light cutting filter and a spectral transmittance characteristic of said imaging element are superimposed to obtain a sensitivity characteristic at capturing, and said sensitivity characteristic approaches to color matching functions of a three stimulus color displaying system.

4. The calibration camera device as defined in claim 1, wherein in said geometrical correction, said optical filter part is set transparent over a visible light range by said filter switching part.

5. The calibration camera device as defined in claim 2, wherein said soft filmy optical filters are gelatine optical filters.

6. The calibration camera device as defined in claim 1, wherein said filter switching part includes a pair of rolling mechanisms and a belt-shaped member which is to be rolled by said rolling mechanisms and on which said optical filters are arranged.

7. The calibration camera device as defined in claim 1, wherein said filter switching part includes a slide photograph equipment with openings and said optical filters are attached to said openings.

* * * * *

UNITED STATES PATENT AND TRADEMARK OFFICE
CERTIFICATE OF CORRECTION

| | | |
|---|---|---|
| PATENT NO. | : 6,960,752 B1 | |
| APPLICATION NO. | : 11/101126 | |
| DATED | : November 1, 2005 | |
| INVENTOR(S) | : Kazuo Yamaguchi | |

It is certified that error appears in the above-identified patent and that said Letters Patent is hereby corrected as shown below:

IN THE CLAIMS

In claim 3, at column 10, line 44, after the word "approaches", delete the word "to".

Signed and Sealed this

Twenty-second Day of August, 2006

JON W. DUDAS
*Director of the United States Patent and Trademark Office*